United States Patent [19]
Schultz et al.

[11] Patent Number: 5,190,153
[45] Date of Patent: Mar. 2, 1993

[54] COMPACT DISC HOLDER

[76] Inventors: Gregory A. Schultz, 229 Ritteu House Road, Kitchener, Ontario, Canada, N2E 2V3; Mark E. Weber, 224 Ritteu House Road, Kitchener, Ontario, Canada, N2E 2V5

[21] Appl. No.: 822,693

[22] Filed: Jan. 21, 1992

[51] Int. Cl.$^5$ ............................................. B65D 85/30
[52] U.S. Cl. .................................. 206/309; 206/387; 206/444; 248/225.1; 248/312.1
[58] Field of Search .................. 206/309, 387, 444; 248/225.1, 311.2, 312.1, 316.1; 312/12, 15, 16, 246

[56] References Cited

U.S. PATENT DOCUMENTS

| | | | |
|---|---|---|---|
| 3,371,976 | 3/1968 | Ritz, Jr. | 206/387 |
| 3,510,008 | 5/1970 | Mason | 206/387 |
| 3,601,464 | 8/1971 | Boer | 312/246 |
| 3,627,398 | 12/1971 | Reese | 312/246 |
| 3,822,049 | 7/1974 | Saunders | 248/225.1 |
| 4,650,072 | 3/1987 | Ackeret | 206/387 |
| 4,678,245 | 7/1987 | Fouassier | 312/246 |
| 4,702,533 | 10/1987 | Seifert | 312/12 |
| 4,771,887 | 9/1988 | Nehl | 206/387 |
| 4,779,730 | 10/1988 | Hartsfield et al. | 206/387 |
| 4,844,564 | 7/1989 | Price, Sr. et al. | 312/16 |
| 4,850,485 | 7/1989 | Ishikawa | 206/387 |
| 4,867,311 | 9/1989 | Metcalf | 206/444 |
| 4,976,350 | 12/1990 | Fukumoto | 206/387 |
| 5,103,986 | 4/1992 | Marlowe | 206/387 |

FOREIGN PATENT DOCUMENTS

| | | | |
|---|---|---|---|
| 2601177 | 1/1988 | France | 206/44 |
| 803710 | 10/1958 | United Kingdom | 312/246 |

*Primary Examiner*—David T. Fidei
*Attorney, Agent, or Firm*—Daryl W. Schnurr

[57] ABSTRACT

A holder for storing compact discs where each disc is contained within a conventional disc container uses a housing and anchoring means for the housing. The anchoring means is used to mount the housing in a motor vehicle. The housing contains partial partitions that are sufficiently large to hold said containers in a spaced apart parallel relationship from one another extending from front to rear of said housing when the disc containers are inserted into the housing through the front. The housing has retention means for each container to hold the containers within the housing when the containers are oriented with the groove towards the rear wall and towards the retention means. The retention means contacts a groove of each disc container and holds said container in said housing until the container is pulled out of said housing so that the retention means automatically releases itself from said disc container. When the holder is used in a motor vehicle, when desired, the housing can easily be removed from the anchoring means and removed from the vehicle. Alternatively, the housing could be removed from the anchoring means but stored in the trunk or glove box of the vehicle.

4 Claims, 6 Drawing Sheets

COMPACT DISC HOLDER

BACKGROUND OF THE INVENTION

1. Field of the Invention

This invention relates to a holder for compact discs and, in particular, to a holder that can be used in motor vehicles and the like and can easily be removed from the motor vehicle but, during use, is anchored in position within said vehicle.

2. Description of the Prior Art

Stackable compact disc storage containers are known. However, previous compact disc holders do not have retention means for each of the compact discs when the discs are inserted into the holder. Further, with previous containers, they are not designed with anchoring means or releasable anchoring means for use in motor vehicles and the like.

SUMMARY OF THE INVENTION

It is an object of the present invention to provide a compact disc holder that is portable and stackable. It is further an object of the present invention to provide a compact disc holder that can be releasably anchored within a motor vehicle and easily removed from said motor vehicle for security purposes. It is still a further object of the present invention to provide a compact disc holder that contains retention means for each disc stored within the holder.

A holder for storing one or more compact discs where each disc is contained within a disc container and each container has a tiny groove extending parallel to one edge thereof and has a housing and anchoring means, said housing having a front, a top wall, a bottom wall, a rear wall and two side walls. The top, bottom and two side walls all extend rearward from said front. The housing contains partial partitions that are sufficiently large to hold at least two containers in a spaced apart parallel relationship to one another extending from front to rear of said housing when said disc containers are inserted into the housing through said front. The housing is sized relative to said disc containers so that said containers fit easily within said housing through said front. The housing has retention means for each disc container to hold the containers within said housing when the containers are oriented with said groove towards said rear and towards said retention means when inserted into said housing. The retention means contacts said groove and becomes released from said groove when a disc container is pulled out of said housing. The anchoring means is a bracket containing a channel along each side, the channels being set back from a front of the bracket. The bracket is sized to receive said housing, said housing having a ridge extending partially along each side. Each ridge is sized and located within the channel with releasable locking means to hold each ridge in each channel when the ridges have been fully inserted.

DESCRIPTION OF A PREFERRED EMBODIMENT

Figure 1:
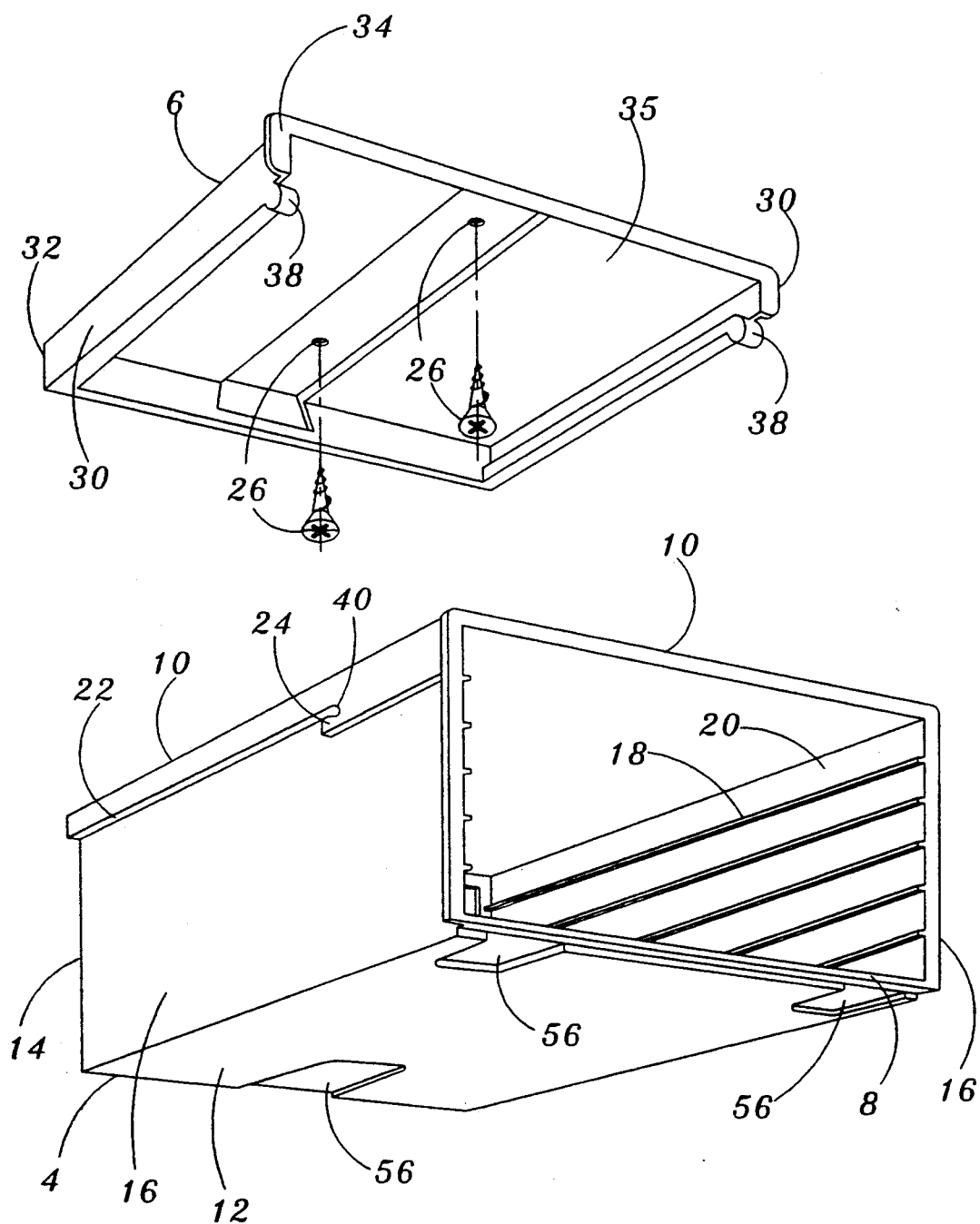
FIG. 1 is an exploded perspective view of a housing and anchoring means.

In FIG. 1, a holder 2 for storing one or more compact discs (not shown) in a motor vehicle (not shown) uses discs contained in a conventional disc container (not shown) where each container has a tiny groove (not shown) extending parallel to one edge thereof. This tiny groove is located along the hinge of the conventional container, said hinge allowing the container to be opened and closed. The holder 2 has a housing 4 and anchoring means 6 for said housing. The housing has a front 8, a top wall 10, a bottom wall 12, a rear wall 14 and two side walls 16. The two side walls, top and bottom all extend rearward from said front. The housing contains partial partitions 18 that extend from front to rear along an interior 20 of each of the side walls 16. The partitions on one side wall 16 correspond to the partitions along the other side wall 16 so that when a plurality of containers are inserted into the housing through said front, the containers are held in a spaced apart parallel relationship to one another with each container resting on a partition on one side wall and a corresponding partition on the other side wall. The housing 4 is sized relative to the disc containers so that the containers fit easily within said housing through said front 8 with the distance between the two side walls being slightly greater than the width of a disc container so that when a container is properly inserted, it will extend from side to side of said housing. Along an exterior of each side wall 16, there extends a ridge 22. The ridge 22 commences at a rear and extends approximately two-thirds of the distance along each side wall toward said front. At a forward end of each ridge 22, there is located a releasable locking means 24.

The anchoring means 6 contains attachment means 26, being openings and screws or bolts for affixing the anchoring means to a dash (not shown) of said motor vehicle. The anchoring means 6 has an inverted U-shape with a channel 28 that extends along each side 30. The channel 28 corresponds to the ridge 22 and is sized and shaped so that said ridge will fit snugly within said channel and slide relative to said channel. Each channel 28 commences at a rear 32 of said anchoring means 6 and extends almost to a front 34 but is set back slightly from said front. The purpose of setting the channel back from the front somewhat is to allow easier insertion of the ridges in said channels. When the channel is set back, the top rear portion of the wall 10 of the housing 4 can be placed in contact with a front inner surface 36 of the anchoring means 6 simply by moving the housing upward relative to the anchoring means. From this position, the housing can easily be moved rearwardly relative to the anchoring means so that the ridge of each side slides within the corresponding channel. Each channel has locking means 38 located at a forward end thereof, said locking means 38 corresponding to the locking means 24 of the housing 4. When the ridges 22 slide a sufficient distance within the channels 28, the locking means 24, 38 interlock with one another. When it is desired to remove the housing from the anchoring means, the housing can simply be pulled forward by a sufficient force to overcome the locking means 24, 38 and the locking means 24, 38 will then release. The locking means 38 is a rounded projection which is sized and shaped to fit within a recess 40 in the locking means 24.

Figure 2:
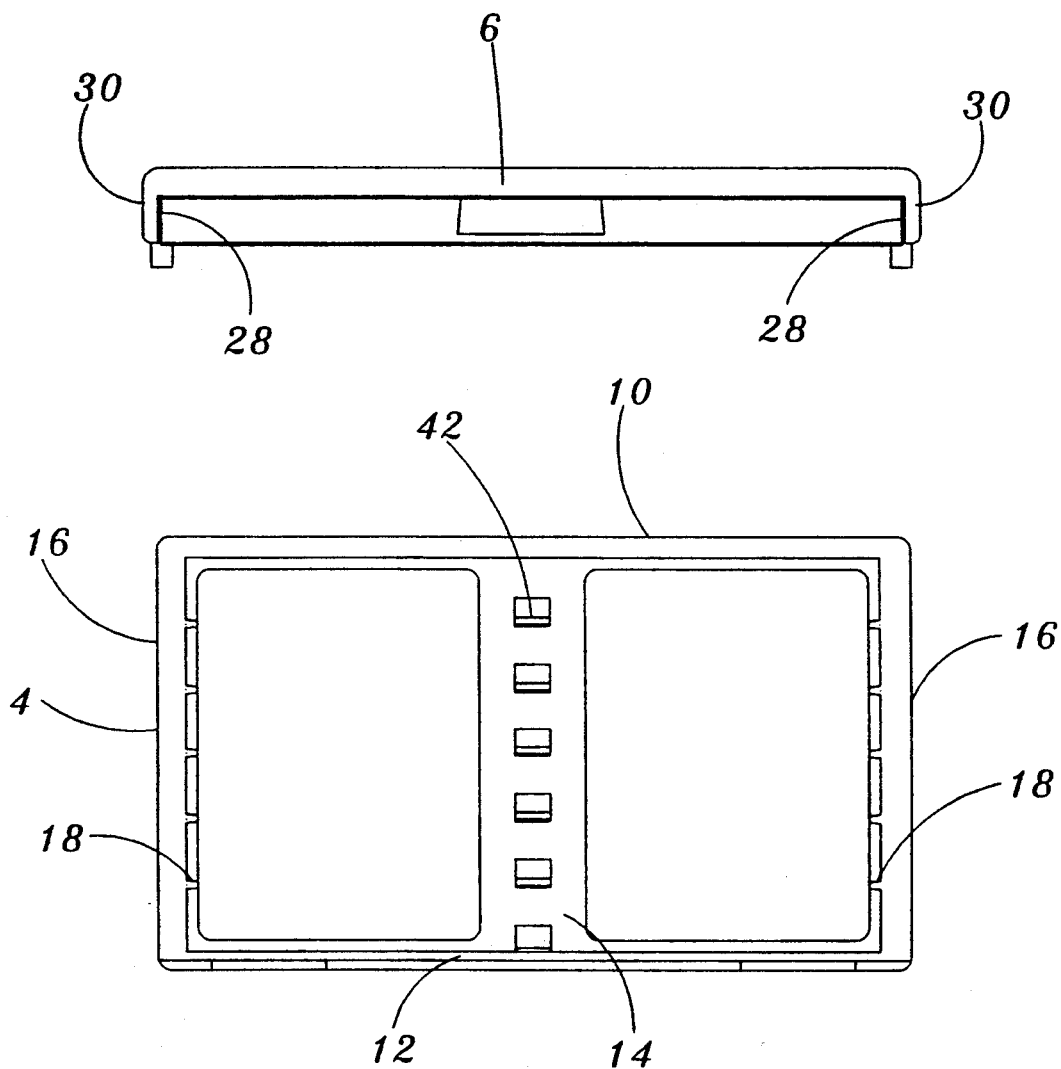
FIG. 2 is an exploded front view of the housing and anchoring means.

In FIG. 2, in the front view of the housing 4 and anchoring means 6, the channels 28 on either side 30 of the anchoring means 6 can readily be seen. On the rear wall 14, there is mounted a plurality of retention means 42. There is one retention means for each zone of the housing in which a compact disc container (not shown) can be stored. It can also be seen that each projection 18 on one side wall 16 has a corresponding projection 18 on the other side wall 16, the two projections that correspond with one another being located on the same horizontal plane when the holder is in an upright position.

Figure 3:
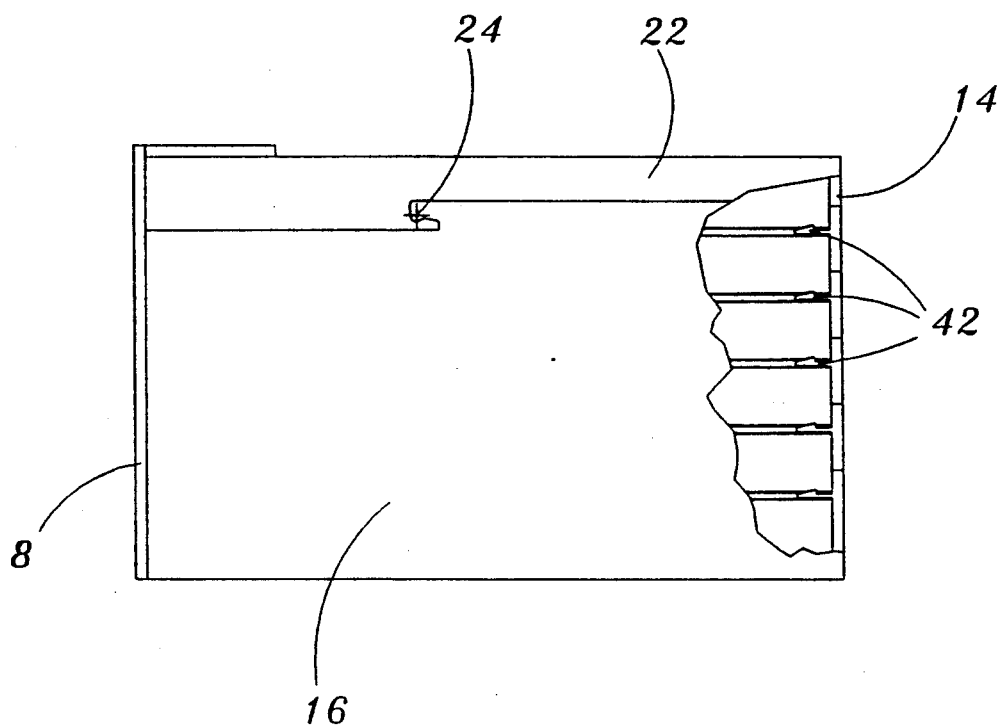
FIG. 3 is a side view of the housing with part of a side wall removed to expose retention means.
Figure 4:
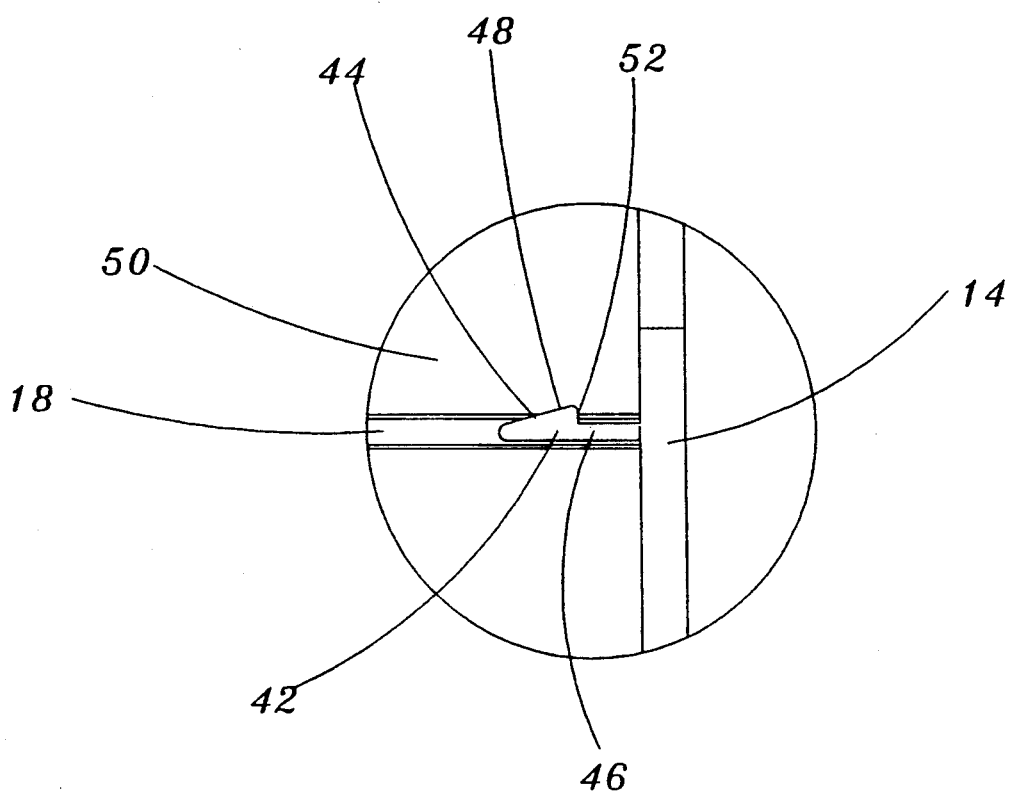
FIG. 4 is an enlarged partial side view of retention means located in a rear of said housing.

In FIG. 3, the location of the retention means 42 relative to the rear wall 14 can be seen. Further, the shape of the locking means 24 can be seen more precisely. In FIG. 4, the shape of the retention means 42 is shown more precisely. It can be seen that the retention means 42 is a clip 44 mounted on an arm 46 which connects the clip 44 to the rear wall 14. To avoid confusion, only one clip is shown in FIG. 4. The position shown for the clip 44 is a rest position and it can be seen that a nose 48 of the clip 44 is located above a level of the partition 18. Each conventional compact disc container has a tiny groove that extends across the container parallel to one of the edges. The groove is located along a hinge (not shown) which is utilized for opening the container. When the compact disc container is oriented so that the container can be inserted into the housing with the groove towards said rear wall 14 and towards said retention means 42, the clip 44 will be forced downward until the container contacts the rear wall 14. At that point, the groove 52 of the container 50 will be aligned with the nose 48 of the clip 44. In FIG. 4, the container 50 is shown to be located slightly above the level of the projection 18 for ease of illustration purposes only. During actual usage, the container 50 will rest on the projection 18. The nose 48 is shaped to conform with the shape of the groove 52. The arm 46 is resilient so that as soon as the groove 52 is located above the nose 48, the clip 42 will move upward so that the nose enters the groove. When the container is removed from the housing, the container is pulled forward. This will force the clip 44 downward and the nose will move out of the groove 52. The clip is important in that it provides retention means for the container 50 when it is inserted into the housing. When the holder is used in a motor vehicle, the clip will prevent, during normal usage, the container from accidentally falling out of the housing. Also, the clip will prevent the container from vibrating within the housing during normal usage. While the retention means holds the container within the housing, it does not prevent the container from being readily removed, when desired.

Figure 5:
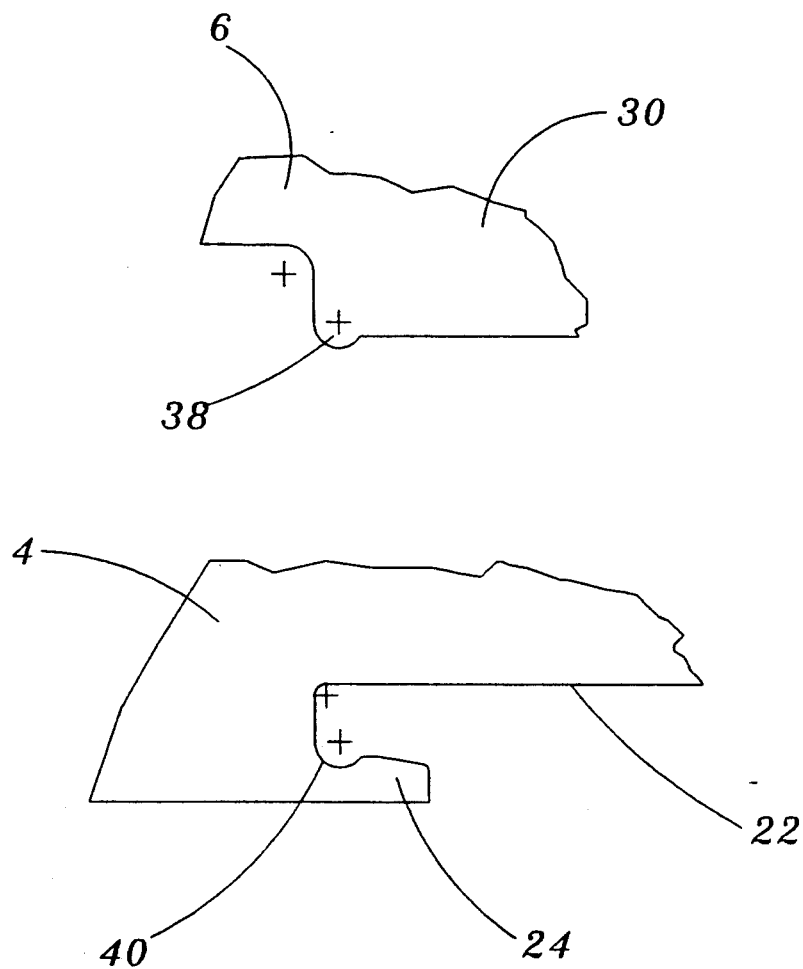
FIG. 5 is an enlarged partial side view of interlocking means on the housing and anchoring means.

In FIG. 5, an enlarged side view of the interlocking means is shown. It can be seen that the locking means on the housing corresponds to the locking means on the anchoring means. When the holder is used in a motor vehicle, the locking means is important to prevent the holder from inadvertently falling away from the anchoring means and also to prevent the holder from vibrating relative to the anchoring means during normal usage. Further, the locking means on the holder and anchoring means is designed so that the holder can be removed from the locking means simply by pulling the holder forward relative to the anchoring means. It is important to be able to remove the holder from the anchoring means. For example, a user may wish to remove all of the compact discs from the motor vehicle for usage in a compact disc player in the user's residence. This can conveniently be done simply by removing the housing from the anchoring means. For use in the residence of the user, the anchoring means is not required. In addition, for security reasons, when the vehicle is parked, the user may desire to remove the housing from the vehicle to prevent the compact discs from being stolen. Alternatively, the housing could be removed from the anchoring means and locked in the glove box or the trunk of the vehicle.

Figure 6:
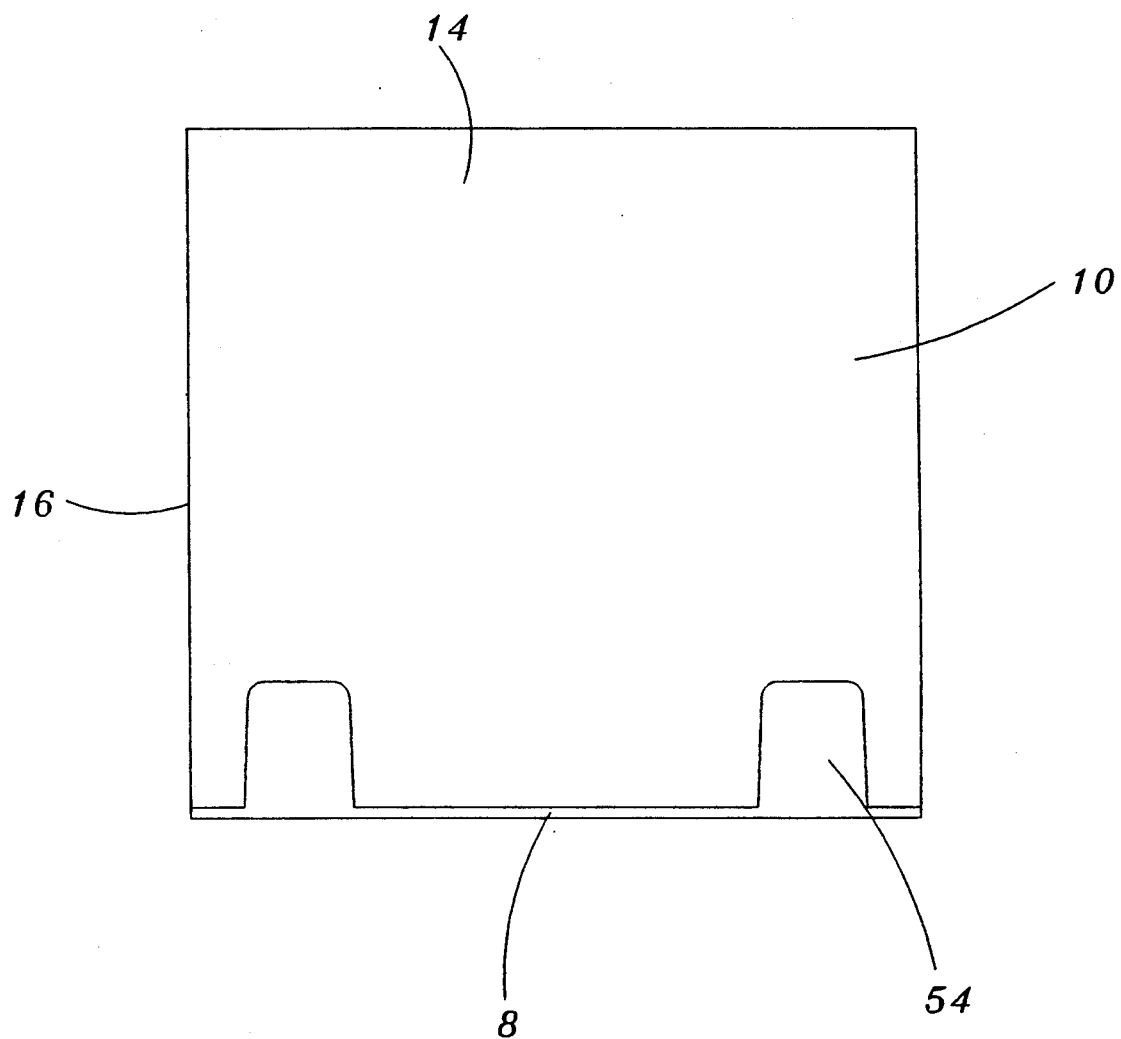
FIG. 6 is a top view of the housing.

From FIGS. 1 and 6, it can be seen that the housing has stacking features, being depressions 54 in the top wall 10 and extensions 56 in the bottom wall 12. Of course, the projections and depressions could be reversed and they are designed solely to provide some stability when a plurality of housings are stacked above one another. The stacking feature is not designed for use with the anchoring means but only when the housings are stacked on a shelf or the like. A rectangular opening 56 located in the bottom wall 12 accommodates the retention means 42 (not shown in FIG. 1), for the lowermost compact disc container (not shown).

What we claim as our invention is:

1. A holder for storing one or more compact discs, each disc being contained within a disc container, each container having a tiny groove extending parallel to one edge thereof, said holder comprising a housing and anchoring means for said housing, said housing having a front, a top wall, a bottom wall, a rear wall and two side walls, said top, bottom and two said walls all extending rearward from said front, said housing containing partial partitions that are sufficiently large to hold at least two containers in a spaced apart parallel relationship from one another extending from front to rear of said housing when said disc containers are inserted into the housing through said front, said housing being sized relative to said disc containers so that said containers fit easily within said housing through said front, said housing having a retention means for each disc container to hold the containers within said housing when the containers are oriented with said grooves towards said rear wall and towards said retention means when inserted into said housing, said retention means contacting said groove and becoming released from said groove when a disc container is pulled out of said housing, said anchoring means being a bracket containing a channel along each side, each channel being set back from a front of the bracket, said bracket being sized to receive said housing, said housing having a ridge extending partially along each side, each ridge being sized and located to fit within the channel, with releasable locking means to hold each ridge in each channel when the ridges have been fully inserted.

2. A holder as claimed in claim 1 wherein the retention means is a resilient clip located within said housing, said retention means being located and biased so that it will extend into part of said groove when said disc container is inserted fully into said housing.

3. A holder as claimed in claim 1 wherein the housing contains stacking mounts on upper and lower surfaces so that one housing can be stacked above another.

4. A holder as claimed in claim 2 wherein the disc containers are supported horizontally when the holder is in an upright position.

* * * * *